United States Patent [19]

Bonney

[11] 4,388,949

[45] * Jun. 21, 1983

[54] MULTIPLE FOUR-WAY CONTROL VALVE

[76] Inventor: Roland W. Bonney, R.F.D. 1, Box 65, Kennebunkport, Me. 04046

[*] Notice: The portion of the term of this patent subsequent to Jul. 6, 1999, has been disclaimed.

[21] Appl. No.: 327,425

[22] Filed: Dec. 4, 1981

Related U.S. Application Data

[63] Continuation-in-part of Ser. No. 215,272, Dec. 11, 1980, Pat. No. 4,337,796.

[51] Int. Cl.³ .............................................. F16K 11/07
[52] U.S. Cl. ........................... 137/625.17; 137/625.69; 137/625.23
[58] Field of Search ..................... 91/536; 137/625.17, 137/625.69, 625.68, 625.21, 625.23, 625.22

[56] References Cited

U.S. PATENT DOCUMENTS

| | | | |
|---|---|---|---|
| 2,547,254 | 4/1951 | Braithwaite | 137/625.17 |
| 2,946,144 | 7/1960 | Anderson | 91/536 X |
| 2,953,164 | 9/1960 | Haberland | 137/625.17 X |
| 3,575,212 | 4/1971 | Wilke | 137/625.69 |

Primary Examiner—Alan Cohan
Attorney, Agent, or Firm—William Nitkin

[57] ABSTRACT

A multiple four-way control valve having a spool within a cylindrical bore defined in the valve housing with first and second pressure grooves defined around the cylindrical bore communicating with first and second pressure channels defined within the valve housing with an outlet port communicating into the cylindrical bore. An inlet port communicates with the cylindrical bore through a first and second relief channel which relief channels further communicate to first and second relief grooves. A first second, third and fourth slots are defined on the spool members adapted to align at various positions to elements of a first and second series of operation ports.

3 Claims, 5 Drawing Figures

MULTIPLE FOUR-WAY CONTROL VALVE

This application is a continuation-in-part of my previously filed application, Ser. No. 215,272 filed Dec. 11, 1980 of the same title, now U.S. Pat. No. 4,337,796 issued July 6, 1982.

BACKGROUND OF THE INVENTION

1. Field of the Invention

This invention relates to valves and more particularly to rotary spool valves.

2. Description of the Prior Art

Spool valves for utilization with hydraulic control systems including the use of four-way valves are well-known in the prior art. The inventor of the present invention has received five prior U.S. Patents in this area, namely U.S. Pat. No. 3,774,504 for a Sliding Spool Valve; No. 4,027,697 for a Rotary Valve; No. 4,124,038 for a Multiway Hydraulic Valve; No. 4,184,513 for a Multiple Three and/or Two-way Valve; and No. 4,177,834 for a Rotary Four-way Tandem Center Valve. These patents and the references cited therein are related to the field wherein the present invention resides. Also considered relevant in the prior art are U.S. Pat. No. 3,213,881 to J. B. Findlay et al for a Directional Control Valve and U.S. Pat. No. 2,749,941 to L. E. Gardiner for a Rotary Control Valve.

SUMMARY OF THE INVENTION

The present invention is a multiple four-way control valve with a tandem center spool having a uniform flow rate regardless of the number of units in the system and which is adapted so that other valves can be aligned therewith.

It is an object of this invention to provide such multiple four-way tandem center directional control valve for the control of double-acting hydraulic cylinders, reversible hydraulic motors and the like.

It is a further object of this invention to provide a valve of simple and economic construction which does not necessarily utilize check member. The valve of this invention can take the place of a plurality of valves making it cheaper to use, lighter in weight, and more compact.

It is a still further object of this invention for one control to operate all of the functions controlled by the valve. The instant invention can be adapted to vary the speed of each or more than one of the cylinders or elements controlled which speed can be increased for one portion and decreased at another portion of the system at the same time.

It is yet a still further object of this invention to provide a flowthrough design for pressure beyond the valve.

The present invention comprises a valve housing having a cylindrical bore defined therein. An inlet port is defined within the valve housing so that a first and a second pressure channel also defined within the valve housing communicate with the inlet port and the cylindrical bore to allow the entrance of hydraulic fluid into the cylindrical bore from the inlet port. First and second pressure grooves are defined around the cylindrical bore of the valve housing communicating with the first pressure channel and the second pressure channel, respectively. An outlet port is also defined within the valve housing communicating into the cylindrical bore. First and second relief channels are defined in the valve housing extending from the sides of the inlet port through the valve housing to first and second relief grooves defined respectively within the cylindrical bore. The spool member is rotatably, axially and movably positioned in the cylindrical bore with a central spool projection member extending therearound adapted so that its outer periphery contacts the valve housing surrounding the cylindrical bore. A first series of four slots are defined upon the rotary spool member in axial alignment and a second corresponding set of four slots are defined on the opposite side of the spool member, the first and fourth slots of the first set are aligned and communicate with the first and second relief grooves respectively when the rotary spool is in a neutral position while the second and third slots of the first series are aligned and communicate with the first and second pressure grooves respectively which are adapted to empty into the outlet chamber. A first and second series of operational ports are each arrayed in a transverse plane to the axis of the spool adapted to be aligned with the slots defined in the spool dependent on the position of the spool. Seal means are provided adapted to seal the spool in a fluid-tight relation within the cylindrical bore. Also, means to equalize pressure opposite each of the operation ports, such as by balance cavities or by balance channels opposite each operation port in the valve housing are provided.

DESCRIPTION OF THE PREFERRED EMBODIMENT

Figure 1:
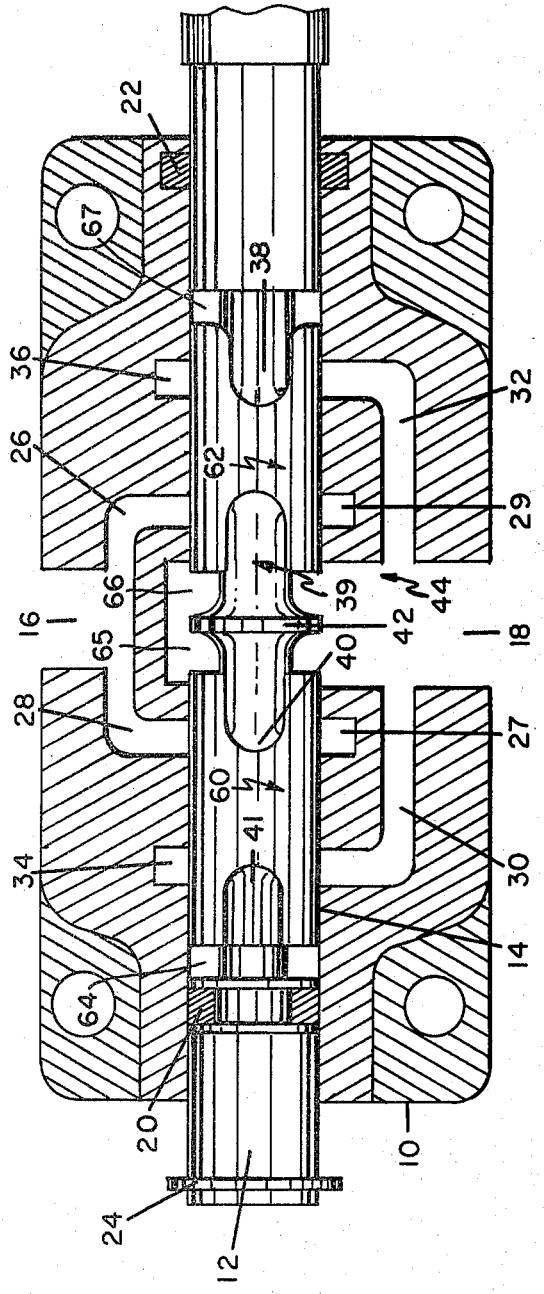
FIG. 1 illustrates the valve body in horizontal cross-section with spool in place.
Figure 2:
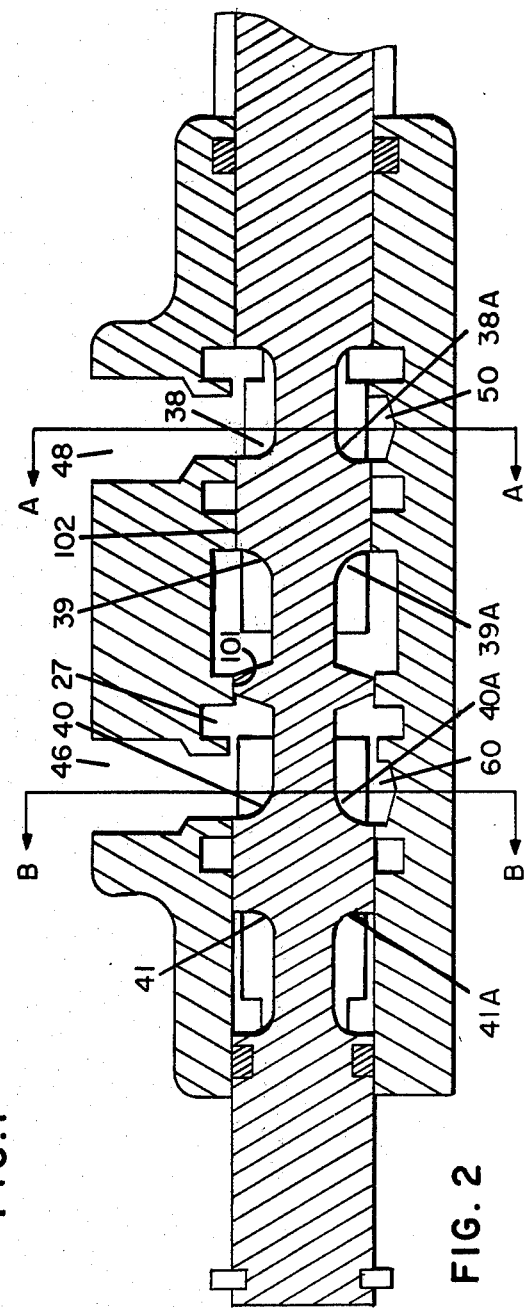
FIG. 2 illustrates a cross-section of the valve body and spool in vertical position with spool in operating position.
Figure 3:
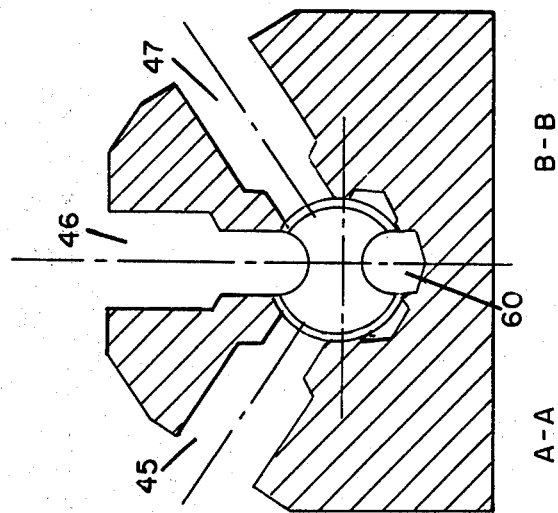
FIG. 3 illustrates a cross-section through either section A—A or B—B of FIG. 2.

FIG. 1 illustrates a top view of a horizontal cross-section of the device of this invention having valve housing 10 with cylindrical bore 14 defined therein. Valve housing 10 includes inlet port 16 and outlet port 18. The inlet port divaricates into a first and second pressure channel 26 and 28, respectively which enter into cylindrical bore 14 and extend therearound in the form of first pressure groove 27 and second pressure groove 29. Outlet port 18 also extends into cylindrical bore 14 and has portions emanating therefrom through valve housing 10 forming a first relief channel 30 and a second relief channel 32 which extend to and around cylindrical bore 14 in the form of a first relief groove 34 and second relief groove 36. Also aligned radially in a semi-circle around the cylindrical bore are a first series of operation ports, one of which 46 is seen in FIG. 2 and others, for example, 45 and 47 in the same plane as 46 are seen in FIG. 3 which is a cross-section through B—B seen in FIG. 2. These operation ports communicate into cylindrical bore 14 as does a second series of operation ports which are in a plane parallel to the first series as seen in FIG. 2 and which is depicted by second operation port 48 of which the second series has at least one or more other operation ports not seen in that view but which are comparable to the ones seen in FIG. 3. Within cylindrical bore 14 is rotary spool 12 which, at either end thereof, is of a diameter adapted to contact the cylindrical bore in fluid-tight relationship. If desired, sealing means such as a first O-ring 20 and a second O-ring 22 can be utilized within grooves defined within the spool or in the valve housing to assist in forming such fluid-tight relationship between the spool and the valve housing. The spool is rotatable within the valve housing and also axially slidable. It can be retained therein by conventional means such as by a lockring 24 which can be mounted within a groove of the segment of the spool which can protrude out the valve housing or by equivalent conventional means. The spool can be manually rotated or rotated by other conventional means as desired and may include stop members to limit its rotational movement and detents for determination by the user as to the rotated position of the spool within the valve. The spool can be self-centering in a neutral position by spring members or other well-known conventional means. Positioned on a central portion of the spool within outlet chamber 44 while the spool is in a neutral position is central spool projection 42 whose periphery is adapted to make fluid-tight contact with the sides of the cylindrical bore. Defined also on the outer peripheral surface of the spool are a first series of four axially extending slots 38, 40, 39 and 41, each of which slots as seen in FIG. 1 have corresponding slots defined on the opposite side of the spool as seen in FIG. 2 and numbered 38A, 39A, 40A and 41A. When this first series of slots are aligned in a neutral position, slots 39 and 39A and 40 and 40A allow the fluid from the inlet port to pass from inlet port 16 through first and second pressure channels 26 and 28, through first and second pressure grooves 27 and 29, around the rotary spool wherein the fluid passes into slots 39 and 39A and 40 and 40A and will then be directed to a narrow portion of the spool and into outlet chamber 44 to pass out through outlet port 18. All operation ports in the neutral position will be closed as a land of the spool will be aligned therewith so that they are in an inactive position. If the spool is pushed to an active position, for example, as seen in FIG. 2 where the central spool projection is now aligned with land 101 of the valve housing, and first operation port 46 is now pressurized through groove 40 because of the fluid coming through first pressure groove 27 and at the same time groove 38 is now aligned with one of the second operation ports 48 and the fluid passes through second relief groove 36, around the rotary spool, through second relief channel 32, into outlet chamber 44, and out outlet port 18. If the rotary spool is rotated, slot 40 would align first pressure groove 27 with either ports 45 and 47 as seen in FIG. 3 depending upon how the spool is rotated or the spool may be rotated midway between the ports thereby pressurizing two of the operation ports at the same time or pressurizing one of the operation ports more than the other if the spool is only partially turned to open into one of them. On the spool slot 38A is opposite slot 38 and is aligned with pressure balance cavity 50 so that the pressure will be evenly distributed on either side of the spool to allow for its easy movement so that it is not forced against a portion of the cylindrical bore. Such pressure balance cavities are located opposite each of the operation ports.

The slots are formed on the first and second collar member 60 and 62 of the spool having a first, second, third and fourth cut-away section defined at the ends of each collar 64, 65, 66 and 67 with the second and third cut-away sections being on either side of the central spool projection. The slots have the same diameter as the operation ports and each slots extends on the axis of the cylindrical bore toward the cut-away sections with their rear ends rising up to meet the cylindrical bore.

Figure 4:
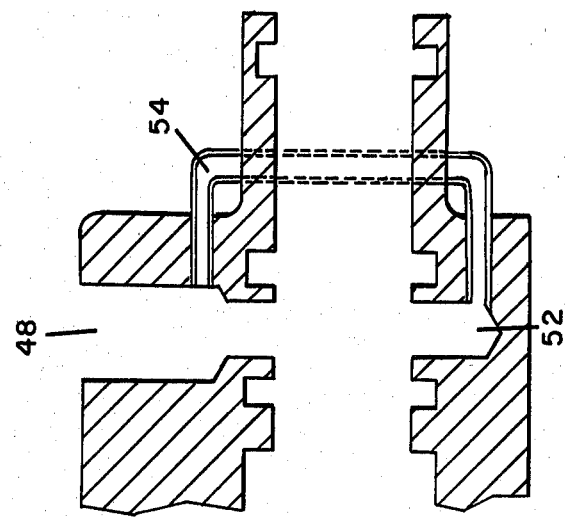
FIG. 4 shows an alternate embodiment of the valve housing with back pressure compensation means.

It should be obvious, if spool 14 is pulled in the opposite direction as depicted in FIG. 2 so that central spool projection 42 aligns with land 102, the reverse steps take place thereby relieving operation port 46 and pressurizing operation port 48. In an alternative mode of construction in case of high back pressure, opposite pressure balance cavities having a separate tubing member 54 seen in FIG. 4, being either a tubing outside or a channel within the casing through which the fluid flows which may be utilized to equalize the pressure on either side of the spool.

Figure 5:
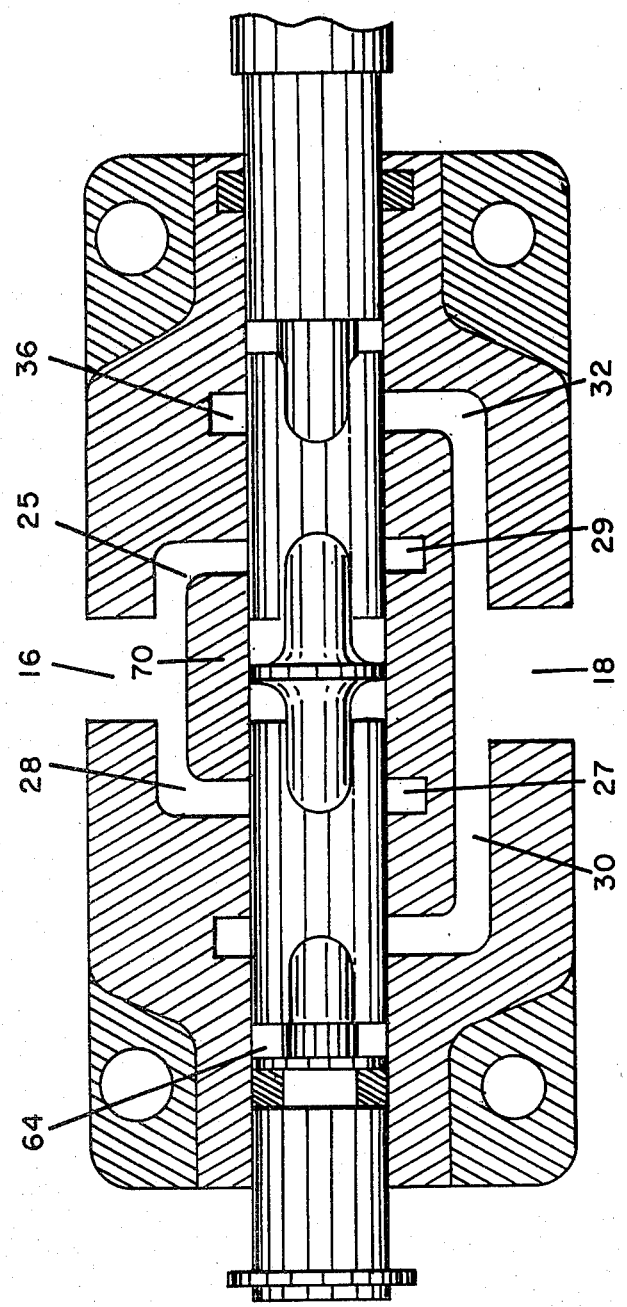
FIG. 5 illustrates closed center design of valve.

The embodiment in FIG. 5 is of a closed center valve which eliminates the outlet from cylindrical bore 14 to outlet chamber 44 seen in the tandem center version in FIG. 1. This closed center version further fills in a land around cylindrical bore 14 and is useful on closed systems and in other respects is the same as the tandem center version in FIG. 1.

Although the present invention has been described with reference to particular embodiments, it will be apparent to those skilled in the art that variations and modifications can be substituted therefor without departing from the principles and spirit of the invention.

I claim:

1. A multiple four-way control valve comprising:
   a valve housing;
   a cylindrical bore defined within said valve housing;
   an inlet bore defined within said valve housing;
   first and second pressure channels defined within said valve housing communicating with said inlet port and said cylindrical bore, to allow the entrance of hydraulic fluid into said cylindrical bore;
   first and second pressure grooves defined around said cylindrical bore of said valve housing communicating with said first and second pressure channels respectively;
   an outlet port defined within said valve housing;
   first and second relief channels defined in said valve housing, extending from said inlet port through said valve housing to said cylindrical bore;
   first and second relief grooves defined around the inside of said cylindrical bore in said valve housing communicating with said first and second relief channels;
   a first series of operation ports of like diameter defined in said valve housing arrayed in a first transverse plane to the axis of, and communicating with, said cylindrical bore;
   a second series of operation ports of like diameter defined in said valve housing arrayed in a second transverse plane to the axis of, and communicating with, said cylindrical bore;
   a spool member positioned in said cylindrical bore and being rotatably and axially movable within said cylindrical bore;
   a central spool projection member extending around and projecting from said spool member with its outer periphery contacting said cylindrical bore;
   first and second collar members protruding from said spool member and contacting said cylindrical bore, each spaced equidistant from said central spool projection, the inner portions of said first and second collar members extending, when said spool member is in a neutral position, to block said first and second pressure channels and said first and second pressure grooves, and the outer portions of which extend beyond said first and second relief grooves and said first and second relief channels, said first and second collar members defining a first, second, third and fourth cutaway section around said spool at their respective inner portion ends and outer portion ends, said second and third cutaway sections being separated by said central spool projection;

first and second slots defined upon said first collar member and third and fourth slots defined on said second collar member, all in axial alignment, said first slot aligned with said first relief groove when said rotary spool is in a neutral position, said second slot aligned with said first pressure groove to empty said first pressure groove into said outlet chamber, said third slot positioned on said valve aligned with said second pressure groove to empty said second pressure channel into said outlet chamber; and said fourth slot aligned with said second relief groove;

seal means adapted to seal said spool in a fluid-tight relation in said housing within said cylindrical bore;

a second series of slots defined on said collar members to equalize pressure on said spool opposite each of said operation ports, each slot opposite one of said first, second, third and fourth slots with a plurality of cavities defined in the valve housing opposite each operation port, said cavities aligned with said second series of slots on said spool;

each of said slots in said first and second series of slots having a width of the diameter of one of said operation ports with its inside rear end terminating at a point contacting said cylindrical bore and its outside end opening into its respective cut-away section around said spool; and said spool when in said neutral position blocks all of said operation ports, said spool if moved into an active position closes off one of said pressure channels by a land on one of said collars while directing the pressure through said slot on the other collar to a rotationally selected operation port while relieving pressure on a corresponding selected operation port of the other series by venting it through a slot on the other collar to said relief channel and to said outlet port.

2. The valve of claim 1 wherein said outlet port communicates into said cylindrical bore and said spool when in said neutral position and under pressure allows hydraulic fluid to pass through said first and second pressure channels around through said first and second pressure grooves, through said narrower cut-away second and third sections of said spool and out said outlet port while said spool is blocking all of said operation ports, said spool if moved into an active position where said central spool projection is aligned with and contacting said cylindrical bore, further closes off one of said pressure channels by a land on one of said collars while directing the pressure through said slot on the other collar to a rotationally selected operation port while relieving pressure on a corresponding selected operation port of the other series by venting it through a slot on the other collar to said relief channel and to said outlet port.

3. The valve of claim 1 or 2 further including means forming a channel for additional relief of high back pressure extending from said cavity opposite each operation port into said operation port to allow fluid under pressure to reach said cavity from said operation port.

* * * * *